Figure 1:
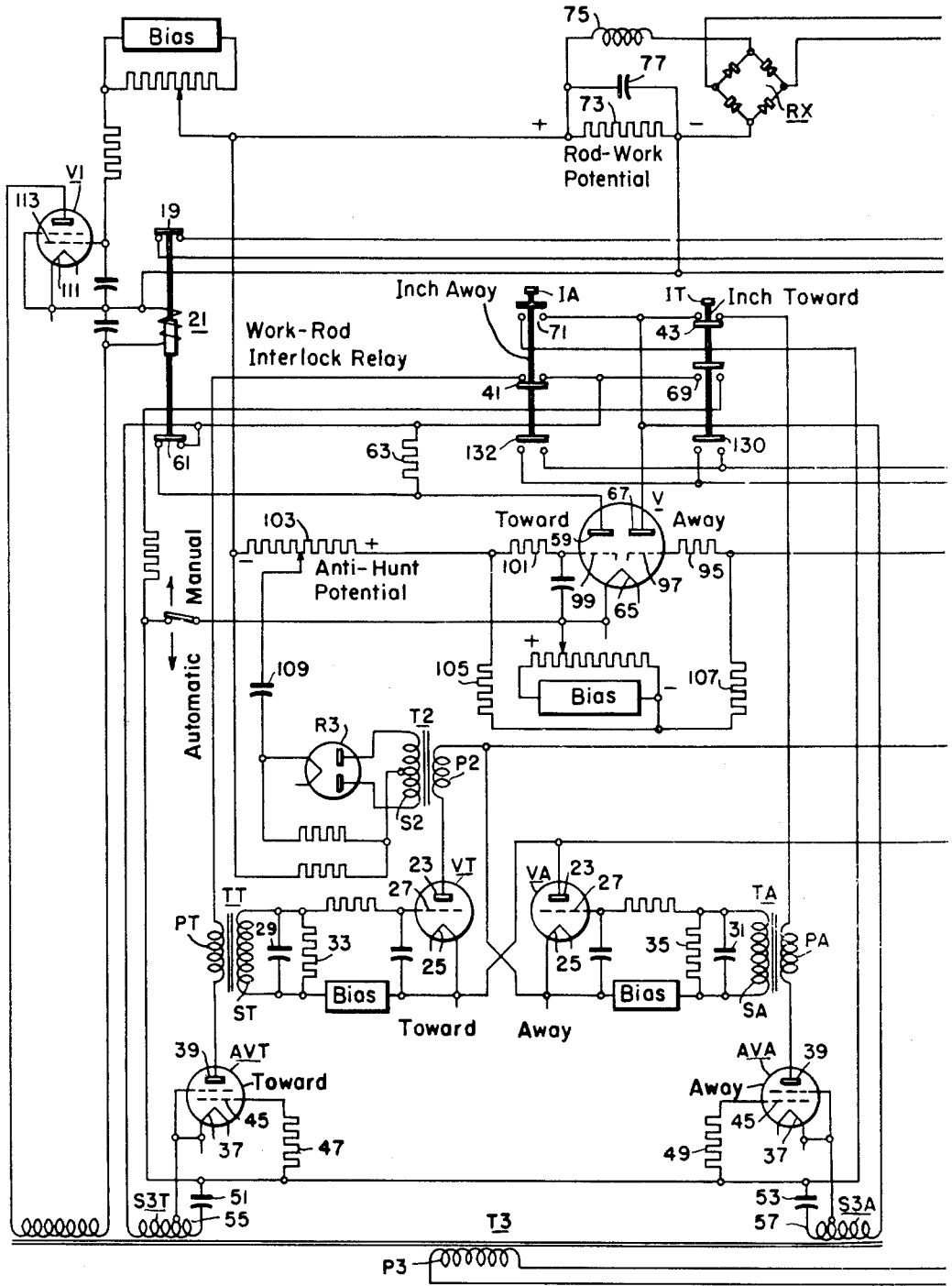

United States Patent Office 2,752,469
Patented June 26, 1956

2,752,469

AUTOMATIC WELDER

Robert W. Price, East Aurora, N. Y., assignor to Westinghouse Electric Corporation, East Pittsburgh, Pa., a corporation of Pennsylvania Application September 28, 1951, Serial No. 248,848

30 Claims. (Cl. 219—8)

My invention relates to electric discharge apparatus and it has particular relation to automatic arc welders.

Automatic arc welders constructed in accordance with the teachings of the prior art of which I am aware have a number of deficiencies. They are bulky in structure including numerous complex mechanical components. Their complexity, in addition to lending the prior art welders rather large dimensions, causes them to be relatively costly and to require costly servicing and maintenance. These welders are, in addition, sluggish in operation and do not lend themselves readily to the achievement of high-speed production.

It is accordingly an object of my invention to provide an automatic arc welder of relatively simple structure which shall have a minimum of mechanical parts and the manufacturing cost and service and maintenance cost of which shall be relatively low.

Another object of my invention is to provide an automatic arc welder in which the welding rod and the work shall be precisely movable in response to control signals.

A further object of my invention is to provide an automatic arc welder which shall operate with either direct current or alternating current supplied between the welding rod and the work and shall be readily adaptable either to direct current or alternating current welding.

A still further object of my invention is to provide an automatic arc welder in which the welding-rod feed and the movement of the work shall be correlated in a manner highly propitious to the performance of a sound welding operation.

Still another object of my invention is to provide an automatic arc welder in which the feed of the welding rod is controlled in dependence upon the potential between the rod and the work and hunting is suppressed.

An incidental object of my invention is to provide a novel motor-control circuit.

Another incidental object of my invention is to provide a novel electronic circuit.

Still another incidental object of my invention is to provide a novel phase-shifting control circuit for an electric discharge device.

A further incidental object of my invention is to provide a novel biasing circuit for an electric discharge device.

Still another incidental object of my invention is to provide a novel relay circuit.

An ancillary object of my invention is to provide an automatic arc welding system which can be readily set up for operation without danger to the operator by actuation of the inching switches.

In accordance with the specific aspects of my invention, the welding rod is fed by a direct-current motor which is supplied through either one or the other of a pair of discharge devices, preferably thyratrons, connected in antiparallel. One of the discharge devices when conductive causes the motor to rotate so that the rod is fed towards the work and the other when conductive causes the motor to feed the rod away from the work. These discharge devices are selectively controlled from an electronic biasing circuit which is responsive to the potential between the welding rod and the work. When the thyratron which causes the rod to move towards the work is rendered conductive an additional component is introduced into the biasing circuit to suppress hunting. This component may be either of a polarity such as to increase the conductivity of the conductive thyratron or to decrease this conductivity depending on the character of the operation involved. The biasing circuit also includes provisions for maintaining at a low magnitude the conductivity of the discharge device which causes the rod to be fed towards the work until the arc is established.

The apparatus according to specific aspects of my invention also includes a motor for moving the work. This motor is interlocked with the biasing circuit for the discharge devices in such manner that it is not energized until the arc is established, and only begins to move the work when the provisions for causing the thyratron which drives the rod towards the work to conduct at a low magnitude is removed from the biasing system.

The apparatus according to my invention is started by operation of a start switch and may be stopped by operation of a stop switch. In accordance with my invention, when the stop switch is operated to stop the work at the end of a weld, the rod is first removed from the work at an accelerated rate and thereafter the power-supply circuit for the welder is opened.

Figure 1A:
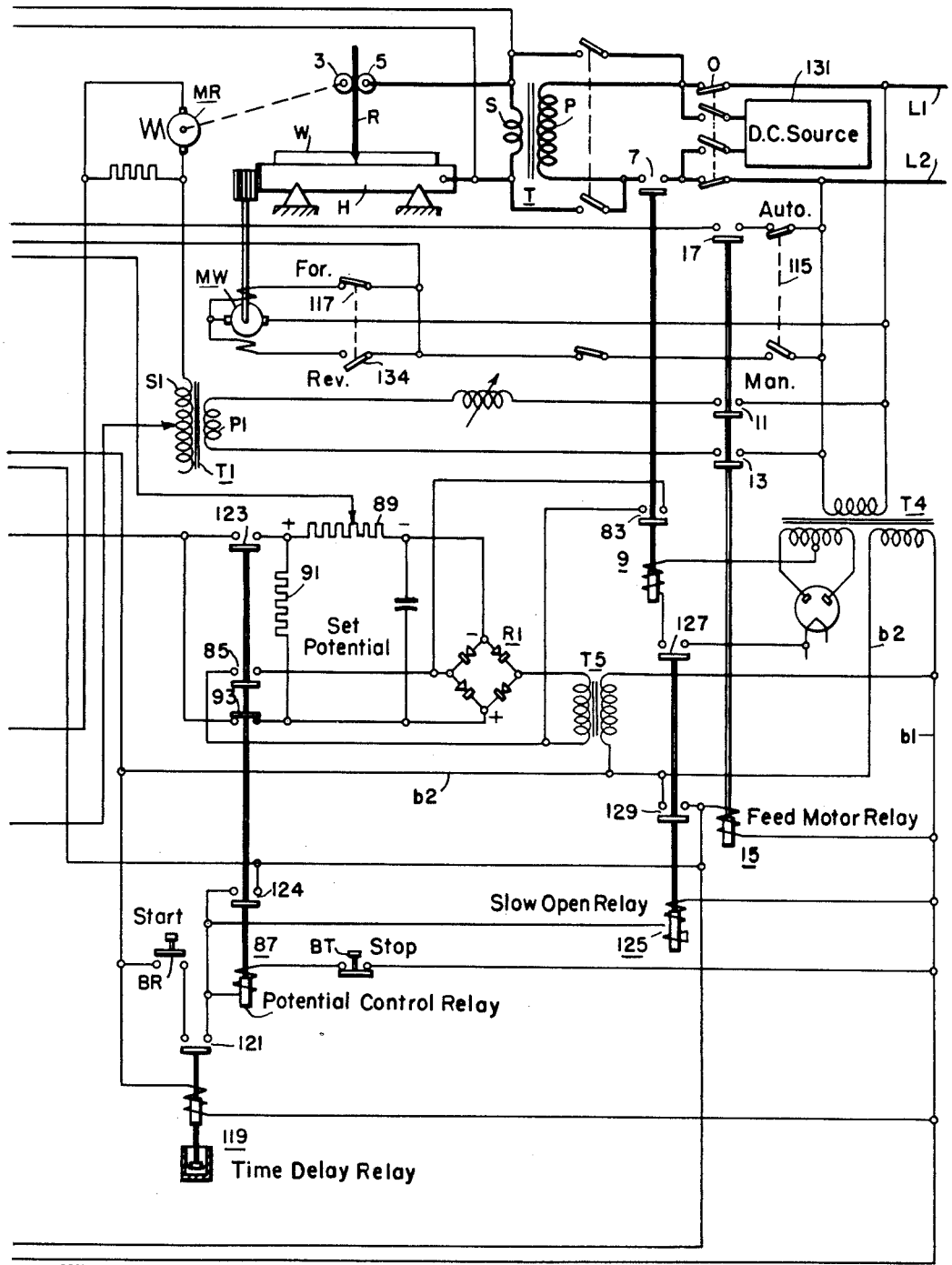

The novel features of my invention are set forth with particularity in the appended claims. The invention itself, however, both as to its organization and its mode of operation, together with additional objects and advantages thereof will best be understood from the following description of a specific embodiment when read in connection with the accompanying drawings, in which Figures 1 and 1A together are a circuit diagram of a preferred embodiment of my invention.

The apparatus shown in the drawing comprises a table or work holder H on which the work W to be welded is mounted. Above the table the welding rod R is mounted so that it may be moved towards and away from the work. The specific contrivance for mounting and moving the welding rod does not concern the present invention and is not shown in any detail. Symbolically, it is illustrated as including a pair of rollers 3 and 5.

In accordance with the specific aspects of my invention the welding is effected by a rod R of the consumable type. This rod is fed to the work to be welded by a direct current motor MR which is symbolically shown as rotating one of the rollers 3.

The table H with the work thereon is movable so that the weld may be produced progressively. This movement is effected by a second motor MW shown symbolically as geared to the table.

The apparatus is shown as connected for alternating-current welding. The alternating-current power is derived from supply buses L1 and L2 which may be the usual commercial buses and is impressed between the welding rod R and the work W from the secondary S of a welding transformer T the primary P of which is adapted to be connected to the buses L1 and L2 by the closing of a normally open contact 7 of a relay 9 which may be called the potential-supply relay.

The rod-feed motor MR is supplied from the secondary S1 of a second transformer T1 the primary P1 of which is energized from the buses L1 and L2 through a pair of normally open contacts 11 and 13 of another relay 15 which may be called the feed-motor relay. The work-moving motor MW is directly energized from the buses L1 and L2 through normally open contacts 17 of the feed-motor relay 15 and a normally closed contact 19 of a third relay 21 which we may call the workrod-interlock relay since it operates to interlock the movement of the rod R and of the work W.

The motor MR is selectively controlled from a pair of thyratrons VT and VA, one VT which we may call the toward thyratron and the other the away thyratron. The anodes 23 and cathodes 25 of these thyratrons are connected in anti-parallel between the brushes of the motor MR and the secondary S1 of the motor supply transformer T1. When the toward thyratron VT is conductive the motor MR rotates to feed the rod R towards the work W, and when the away thyratron VA is conductive the motor rotates to feed the rod away from the work. In series with the motor and the toward thyratron, there is the primary P2 of a transformer T2 which supplies a hunt-suppressing potential.

Each of these thyratrons VT and VA is controlled from an auxiliary thyratron AVT and AVA. The control is effected through a transformer TT and TA, the secondary ST and SA of which is in each case connected between the control electrode 27 and cathode 25 of the associated main thyratron VT and VA, respectively, through a suitable bias. To stabilize the operation of each main thyratron VT and VA, a capacitor 29 and 31 and a resistor 33 and 35 of suitable magnitude are connected in parallel across its corresponding secondary ST and SA respectively.

Each of the auxiliary thyratrons AVT and AVA is supplied from a secondary section S3T and S3A of a multi-secondary transformer T3. Each of the secondaries S3T and S3A is provided with terminal taps and an intermediate tap. The cathode 37 of the associated auxiliary thyratron AVT and AVA is in each case connected to the intermediate tap. The anode 39 of the auxiliary toward thyratron AVT is connected to a terminal tap of its associated secondary section S3T through a primary PT of its associated control transformer TT and normally closed contacts 41 of a switch IA for inching the welding rod R away from the work W. The anode 39 of the away auxiliary thyratron AVA is connected through the primary PA of the associated control transformer TA and normally closed contacts 43 of a switch IT for inching the welding rod R toward the work to a terminal tap of its associated section S3A. The control electrode 45 of each of the auxiliary thyratrons AVT and AVA is connected to the remaining terminal tap of its associated section S3T and S3A respectively through a suitable resistor 47 and 49 and a capacitor 51 and 53.

During the half periods of the supply when the anode 39 of each of the auxiliary thyratrons is in its turn negative, the terminal tap connected to the capacitor 51 and 53 respectively is in each case positive. Current flows between the control electrode 45 and the cathode 37 of the associated auxiliary thyratron to charge the capacitor 51 and 53 so that its plate which is connected to the control electrode 45 is negative and its other plate which is connected to the cathode 37 through a section 55 and 57 of the corresponding secondary S3T and S3A, respectively, is positive. At the beginning of the half periods of the supply when the anode 39 of each of the auxiliary thyratrons AVT and AVA is in its turn positive relative to the cathode 37, the capacitor 51 and 53 in the corresponding control circuit impresses a bias to maintain this thyratron non-conductive. This bias is dissipated during this latter half period through the corresponding section of a double triode V, one section of which is associated with each of the auxiliary thyratrons. The sections of the double triode V may be designated as the toward section and the away section.

The anode 59 of the toward section is connected through normally closed contacts 61 of the work-rod-interlock relay 21 and through closed contact 41 to the anode 39 of the toward auxiliary thyratron AVT and thus to a terminal tap of the associated secondary S3T. When this normally closed contact 61 is opened, this anode 59 is connected to the anode 39 through a resistor 63. The cathode 65 of the double triode V is connected to the junction of the associated capacitor 51 and resistor 47. The capacitor 51 may thus discharge through the toward section 59—65 of the double triode V. The anode 67 of the away section of the double triode V is connected through the closed contact 43 to the anode 39 of the away thyratron AVA and through a terminal tap of the corresponding secondary S3A. The common cathode 65 is also connected to the junction of the corresponding resistor 49 and capacitor 53. This capacitor may then also discharge through the latter section 67—65. The rate at which the capacitors 51 and 53 discharge is determine by the conductivity of the sections 59—65 and 67—65 of the double triode V and in turn determines the instants in the half periods of the supply when the auxiliary thyratrons AVT and AVA are rendered conductive and render conductive the main thyratrons VT and VA. The instant when each of the thyratrons AVT, VT and AVA, VA is rendered conductive is precisely determined by an alternating current ripple superimposed on the potential supplied by the associated capacitor 51 and 53.

The toward section 59—65 of the double triode V may be shunted out by normally open contacts 69 of the inch toward switch IT. The away section 67—65 of the double triode may be shunted out by normally open contacts 71 of the inch away switch IA. When either of these switches is closed, the associated capacitor is quickly discharged through the now-closed contact of the closed switch and the associated main thyratron VT or VA is rendered conductive early in the positive half periods of the supply.

The double triode V is controlled in dependence upon the magnitude of the potential between the rod R and the work W. This potential is derived from a rectifier RX connected between the rod and the work, the direct-current output of which supplies a resistor 73 through a filtering reactor 75. The resistor 73 we may call rod-work potential resistor. A filtering capacitor 77 is connected across the resistor 73. The potential between the rod R and the work W is balanced against a set potential. This set potential is derived from a transformer T4 supplied from the buses L1, L2 through a second transformer T5 and a rectifier R1. We may call the transformer T5 the set-potential transformer and the rectifier R1 the set-potential rectifier.

The alternating-current input circuit to the rectifier R1 is adapted to be closed by a normally open contact 83 of the potential-supply relay 9 and alternatively by a normally open contact 85 of another relay 87 which we may call the potential-control relay. The direct-current output of the rectifier R1 is supplied to a variable resistor 89 and a fixed resistor 91 connected across the terminals of the rectifier R1. The variable resistor 89 may be set within limits at any desired magnitude so that the desired effect may be achieved.

With the apparatus in a quiescent state and the potential-control relay 87 deenergized, the positive terminal of the set-potential rectifier is connected through a normally closed contact 93 of the potential-control relay 87 and a grid resistor 95 to the control electrode 97 of the away section of the double triode V. The other control electrode 99 of the double triode V is connected through a grid resistor 101 and a hunt-suppressing resistor 103 to the positive terminal of the rod-work-potential resistor 73. The negative terminal of this resistor 73 is connected to the adjustable tap of the variable resistor 89 in the set-potential circuit. Between the control electrodes 97 and 99 of the double triode V a pair of resistors 105 and 107 is connected. The junction of these resistors is connected to the cathode 65 of the double triode through a biasing potential which maintains the double triode V non-conductive when the operation of the apparatus is just initiated.

The anti-hunt resistor 103 is supplied at its adjustable tap from the toward main thyratron VT through the secondary S2 of the transformer T2, a rectifier R3 and a capacitor 109. The resistor 103 may be connected in the control circuit of the toward section 59—65 so that it provides a potential of either positive or negative polarity in this control circuit. As actually shown, the potential is of the same polarity as that provided by the rod-work-potential resistor 73.

The work-rod-interlock relay 21 is controlled from still another thyratron VI. When this thyratron is non-conductive, the work-rod-interlock relay 21 is deenergized. The resistor 63 in the toward section 59—65 of the double triode V is then shunted out, and the circuit through the motor MW which drives the work W is closed. When this thyratron is conductive, the relay 21 is energized and both circuits are open.

The thyratron VI is controlled from the rod-work-potential resistor 73. The negative terminal of this resistor 73 is connected to the cathode 111 of the thyratron VI, and its positive terminal is connected to the control electrode 113 through an adjustable bias. The work-rod-interlock thyratron may thus be energized in dependence upon the potential between the work W and the rod R.

To operate the welder, power is supplied to the buses L1 and L2, the manual-automatic switch 115 is set in the automatic position, and the forward-reverse switch 117 is set in the forward position. When the buses L1 and L2 are first supplied with potential, the heaters of the various thyratrons and other discharge devices are energized. As the same time, a time delay relay 119 is energized. The latter remains open for a predetermined time interval of the order of five minutes to enable the various heaters to reach the proper emissive temperatures for operation of the thyratrons and other discharge devices. Once the time delay relay 119 is actuated, the operation of the system may be initiated. At this time the potential-supply relay 9 and the potential-control relay 87 are both deenergized, and the supply circuit for the set potential is open and the set potential is not supplied in the control circuits of the double triode V. However, the sections of the latter are non-conductive because the primary circuit of transformer T3 from which they are supplied is open.

The operation may be started by the closing of a start switch BR which may be an ordinary foot-operated button. With the closing of the start switch, a circuit is closed through the exciting coil of the potential-control relay 87 which extends from one terminal of an auxiliary bus b1 supplied from the supply transformer T4, a stop switch BT, the exciting coil of relay 87, the now-closed contact 121 of the time delay relay 119, the start button BR to the other auxiliary bus b2. The potential-control relay 87 is now energized. At its now-closed contact 85, it closes the supply circuit for the set potential, and the set-potential resistors 89 and 91 now conduct current. At another now-closed contact 123, the junction of the variable resistor 89 and the fixed resistor 91 is connected to the control electrode 97 of the away section of the double triode V. The connection between the positive terminal of the rectifier R1 and this control electrode 97 is broken at the now open contact 93 of the potential-control relay.

At the now-closed contact 124 of the potential-control relay 87, the supply circuit through the primary P3 of the transformer T3 is closed. This circuit extends from bus b1, through primary P3, the closed contact 124, the closed contact 121 and the start button BR.

A circuit is also closed through the exciting coil of a slow-open relay 125. This circuit extends from the auxiliary bus b1 through the coil of relay 125, the closed contact 121 of the time-delay relay 119, the start button BR, to the other auxiliary bus b. A normally open contact 127 of the slow-open relay 125 now immediately closes, closing a circuit through the exciting coil of the potential-supply relay 9. The latter relay is now energized. At one of its now-closed contacts 83, it closes an alternative circuit through the set-potential supply R1. At its other now-closed contact 7, it closes the circuit through the primary P of the welding transformer T. At another now-closed contact 129 of the slow-open relay, a lock-in circuit for primary P3 is established. This circuit shunts out the button BR and the now-closed contact 124 of the potential-control relay 87.

When the potential-control relay 87 is energized, it also closes a circuit through the feed-motor relay 15. This circuit extends from one auxiliary bus b1 through the exciting coil of the relay, a now-closed contact 124 of the potential-control relay 87, the closed contact 121 of the time-delay relay 119, the start button BR to the other auxiliary bus b2. This relay 15 is also locked in through a now-closed contact 129 of the slow-open relay 125. The rod-feed motor circuit is closed through the pair of contacts 11 and 13 of the feed-motor relay which are now closed. The normally open contact 17 of the feed-motor relay 15 which is in circuit with the normally closed contact 19 of the work-rod-interlock relay 21 and the work-feed motor MW is also closed. However, at this time the rod R is at a substantial distance from the work W, and, therefore, the positive potential of the rod-work potential resistor 73 is substantial. The work-rod-interlock thyratron VI is then conductive, and the work-rod-interlock relay 21 is energized so that the work-feed motor MW is deenergized.

Because the rod R is at a substantial distance from the work and the positive potential of the work-rod-potential resistor 73 is high, the bias of the control electrode of the toward section 59—65 of the double triode V is counteracted, and the latter is rendered conductive. The conductivity, however, is not high because of the resistor 63 in the anode circuit of this section. The capacitor 51 in the control circuit of the toward auxiliary thyratron AVT is discharged through the toward section 59—65 and the auxiliary thyratron conducts at instants late in its positive half periods rendering the main toward thyratron conductive VT at these instants. The rod feed motor is then rotated at a low speed causing the rod R to approach the work W slowly.

The rod R eventually comes into contact with the work W reducing the potential across the rod-work-potential resistor 73 to a low magnitude. The set potential is now greater than the work-rod potential and the away section 67—65 of the double triode V is rendered conductive, and the toward section 59—65 is rendered non-conductive. The capacitor 53 in the control circuit of the away auxiliary thyratron AVA is now discharged during the half periods when its anode-cathode potential is positive at a substantial rate and the latter thyratron is rendered conductive early in the positive half periods of its supply. The away main thyratron VA is correspondingly rendered conductive, and the rod-feed motor MR is rotated at a substantial speed and in a direction such as to move the rod R away from the work W. At this time the toward section 59—65 of the double triode V being non-conductive, the capacitor 51 of the associated auxiliary thyratron AVT maintains its charge to maintain the latter non-conductive. The toward main thyratron VT is then non-conductive.

Because the rod-work potential is low, the work-rod-interlock thyratron VI and the work-rod-interlock relay 21 are deenergized. The resistor 63 in the toward section 59—65 of the double triode V is shorted and the circuit through the work-feed motor MW is closed. The work W may now be fed as it is welded. When the rod R is moved out of disengagement with the work W, an arc is struck between the rod and the work and the deposit of metal starts.

The welding and the movement of the work W now continues. If at any instant the rod R is burned away at an excessive rate so that the potential between the rod R and the work W becomes substantial, the potential across the rod-work potential resistor 73 rises. The set potential (89) is then counterbalanced in such manner that the toward section 59—65 of the double triode V is rendered conductive and the away section 67—65 non-conductive. Since at this time the work-rod-interlock relay is deenergized, the resistor in the toward section 59—65 is shunted out, and this section is highly conductive. The auxiliary toward thyratron AVT then becomes conductive early in the positive half periods of its supply, and the toward main thyratron VT is correspondingly rendered conductive. The motor then rotates at a substantial speed so as to cause the rod R to approach the work W rapidly. This effect is accelerated by the potential impressed on the anti-hunt resistor 103. When the rod R approaches too closely to the work W, the away main thyratron VA is correspondingly energized, and the rod is moved back from the work. When the rod R is at the proper distance from the work W, the potential across the set-potential resistor 89 and the potential across the rod-work-potential resistor 73 balance each other so that the double triode V is non-conductive and neither thyratron VT or VA is conductive.

The welding operation may now continue automatically until the work W is welded. At this time the start switch BR is open, but the potential-control relay 87 is locked in through its now-closed lock-in contact 124 in a circuit which includes the normally closed stop switch BT. The slow-open relay 125 is also locked in through the same contact 124 of the potential-control relay 87. The potential-supply relay 9, therefore, remains energized. The feed-motor relay 15 is locked in through the now-closed contact 129 of the slow-open relay. The primary of the transformer which supplies the auxiliary thyratrons is also locked in through the now-closed contact 129 of the slow-open relay.

To stop the operation, the stop switch BT is opened. The lock-in circuit through the potential-control contact 124 is now opened, and the latter relay 87 is deenergized. The slow-open relay 125, however, remains energized for a short time interval, and during this interval the feed-motor relay 15, the potential-supply relay 9, and the primary P3 of the transformer which supplies the auxiliary thyratrons AVT and AVA and double triode V remain energized. Since at this time the potential-control relay 87 is deenergized, the positive terminal of the set-potential circuit is connected to the control electrode 97 of the away section 67—65 and the junction of the variable and fixed resistors 89 and 91 is disconnected. The control electrode 97 of the away section is then at a higher positive potential than during operation and the away section is highly conductive. The away thyratron VA is, therefore, highly conductive, and the rod R is quickly retracted from the work W and the arc between the rod and work broken. Thereafter, the slow-open relay 125 is deenergized, the feed-motor relay 15 is deenergized, and the primary P3 of the transformer which supplies the auxiliary thyratrons AVT and AVA and the double triode V is deenergized and the system is set for another complete operation.

Operation of either of the inch-toward or the inch-away switches IT or IA closes the circuit across the corresponding section 59—65 or 67—65 of the double triode V causing the capacitor 51 or 53 of the associated auxiliary thyratron to discharge at a substantial rate. The corresponding auxiliary thyratron AVT or AVA is then rendered conductive, and the rod is moved toward and away from the work, depending on which of the switches is closed. The inch-toward and inch-away switches each includes a normally closed contact 43 and 41 in the circuit of the inch-away and the inch-toward auxiliary thyratron AVA and AVT, respectively, and the latter circuits are maintained open to prevent simultaneous operation of the corresponding main thyratrons VA and VT.

The inch-toward and inch-away switches IT and IA respectively, each has a second normally open contact 130 and 132 by the closing of either of which certain selected components of the apparatus are operated. The operation of these components enables the operator to set up the apparatus for welding without energizing the welding transformer and thus without endangering himself. Since contacts 130 and 132 are in parallel operation of only one of these contacts need be considered.

Assume then that in the quiescent state of the apparatus the inch-toward switch IT is actuated. A circuit is then closed from the bus b1 through the exciting coil of the feed-motor relay 15, the inch-toward contact 130 to the bus b2. The feed-motor relay 15 is actuated. The circuit through the work feed-motor MW is closed at contact 17, and the work may be fed forward or reverse by closing the forward switch 117 or the reverse switch 134.

The circuit through the transformer T1 is also closed at contacts 11 and 13. In addition a circuit is closed from bus b1 through the primary P3 of transformer T3, the contact 130 to bus b2. Power is thus supplied to the inch-toward and inch-away main and auxiliary thyratrons VT and VA and AVT and AVA and to the interlock thyratron VI. The rod-feed motor MR is now energized to feed the rod towards the work.

By operation of the inch-away switch IA the rod R may be moved away from the work in a similar manner with the apparatus otherwise quiescent.

The apparatus disclosed herein constitutes an automatic arc welder of relatively simple and low-cost structure which is reliable in its operation. Such a welder requires a minimum of servicing and can be maintained in operation without difficulty.

The automatic welder is adapted for welding with direct current as well as alternating current. Symbolically, the direct-current supply 131 which may be a generator is shown as capable of being connected to the rod R and work W by a selector switch O which as shown also disconnects the transformer T. The switch O is shown merely for convenience and, in general, does not constitute a part of the system. Only the connection represented by operation of the switch O is required to convert the system from alternating-current to direct-current welding. The control system need not in any way be disturbed. It is seen that in direct-current welding the circuit through the direct-current generator is closed by the normally open contact 7 of the potential supply relay.

In accordance with its specific aspects, my invention is applicable to welding with a consumable rod and is intimately tied up with a welding system of the consumable-rod type. In its broader aspects, however, my invention is applicable to welding with a non-consumable electrode, cutting with such an electrode and arc heating in which an arc is produced between the adjustable rod and the work to be heated and even to lighting by means of an arc. To the extent that my invention is applicable to such uses, such uses shall lie within the scope thereof.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. In combination a first electric discharge device having an anode, a cathode and a control electrode; a capacitor; a first network including in series said control electrode, said cathode, said capacitor and first means adapted to impress an alternating potential; a second network including in series said anode, said cathode and second means adapted to impress an alternating potential; a second electric discharge device having an anode and a cathode; a third network including in series said capacitor, said anode of said second device and said cathode of said second device; and means for controlling said second device, the said combination being characterized by that said potential impressed on the control electrode of the first device by the first means and the potential impressed on the anode of the first device by the second means are of opposite phase and also by that the capacitor is of such magnitude that when said second device is conducting said capacitor discharges sufficiently during a half period of positive anode-cathode potential on said first device to permit said device to conduct during said half period.

2. An automatic arc welder for welding work with a consumable welding rod comprising a D. C. motor for feeding said rod; a first electric discharge device having an anode, a cathode, and a control electrode; means so connecting said anode and cathode to said motor that when said device is conductive said motor feeds said rod toward said work; a second discharge device having an anode, a cathode and a control electrode; means so connecting said anode and cathode of said second device in circuit with said motor that when said device is conductive said motor feeds said rod away from said work; and means responsive to the potential between said rod and said work and connected to said control electrodes to control the conductivity of said devices, said responsive means including means for maintaining the conductivity of said first device at a low magnitude when said potential exceeds a predetermined magnitude.

3. An automatic arc welder for welding work with a consumable welding rod comprising a first motor for feeding said rod; a second motor for moving said work so that it is welded progressively; a first electric discharge device having a main circuit and a control circuit; means for connecting said main circuit of said first device to said first motor so that when said device is in predetermined state of conductivity it causes said first motor to feed said rod toward said work; a second discharge device having a main circuit and a control circuit; means for connecting said main circuit of said second device to said first motor so that when said device is in a predetermined state of conductivity it causes said motor to feed said rod away from said work; means responsive to the potential between said rod and said work and connected to the control circuits of said discharge devices, to control the conductivity of said devices selectively so that said rod may be fed toward or away from said work, said responsive means including means for maintaining the conductivity of said first device such that said rod is fed slowly when said potential exceeds a predetermined magnitude; a third circuit for said second motor; said third circuit when closed being adapted to cause operation of said motor; and means responsive to said maintaining means for maintaining said circuit open so long as said potential exceeds said predetermined magnitude and closing said circuit when said potential is less than said predetermined magnitude.

4. An automatic arc welder for welding work with a consumable welding rod comprising a motor for feeding said rod; a first electric discharge device having a main circuit and a control circuit; means for connecting said main circuit of said first device to said motor so that when said device is in a predetermined state of conductivity it causes said motor to feed said rod toward said work; a second discharge device having a main circuit and a control circuit; means for connecting said main circuit of said second device to said motor so that when said device is in a predetermined state of conductivity it causes said motor to feed said rod away from said work; and means responsive to the potential between said rod and said work and connected to the control circuits of said discharge devices, to control the conductivity of said devices selectively so that said rod may be fed toward or away from said work, said responsive means including means for maintaining the conductivity of said first device such that said rod is fed slowly when said potential exceeds a predetermined magnitude.

5. An automatic arc welder for welding work with a consumable welding rod comprising a first motor for feeding said rod; a second motor for moving said work so that it is welded progressively; a first circuit for said first motor which when closed is adapted to cause said first motor to feed said rod toward said work; a second circuit for said first motor which when closed is adapted to cause said first motor to feed said rod away from said work; means responsive to the potential between said work and said rod for selectively closing one or the other of said circuits, said responsive means including means for actuating said first circuit to cause said first motor to move said rod at a lower rate when said potential exceeds a predetermined magnitude and a higher rate when said potential is lower than said magnitude; a third circuit for said second motor which when closed is adapted to cause said motor to move said work and means responsive to said actuating means for closing said third circuit when said potential is lower than said predetermined magnitude.

6. Apparatus for controlling the supply of power to, and the operation of, a pair of electrodes between which an arc is to be produced comprising means for moving said electrodes towards each other or away from each other; means for impressing a potential between said electrodes to produce an arc therebetween; manual means for starting the operation of said apparatus, manual means for stopping the operation of said apparatus; means responsive to said starting means for actuating said moving means to move said electrodes selectively and to render effective said potential impressing means; and means responsive to said stopping means for actuating said moving means to move said electrodes away from each other for a predetermined time interval while said potential impressing means is still effective and thereafter interrupting the actuation of said moving means and rendering said potential impressing means ineffective.

7. Apparatus for controlling the supply of power to, and the operation of, a pair of electrodes between which an arc is to be produced comprising means for moving said electrodes towards each other or away from each other; means for impressing a potential between said electrodes to produce an arc therebetween; manual means for starting the operation of said apparatus; manual means for stopping the operation of said apparatus; means responsive to said starting means for actuating said moving means to move said electrodes selectively and to render effective said potential impressing means; and means responsive to said stopping means for actuating said moving means to move said electrodes away from each other at an accelerated rate for a predetermined time interval while said potential impressing means is still effective and thereafter interrupting the actuation of said moving means and rendering said potential impressing means ineffective.

8. Apparatus for controlling the supply of power to, and the operation of, a pair of electrodes between which an arc is to be produced comprising means for moving said electrodes towards each other or away from each other; means for impressing a potential between said electrodes to produce an arc therebetween; means for starting the operation of said apparatus; means for stopping the operation of said apparatus; means responsive to said starting means for actuating said moving means to move said electrodes selectively and for rendering effective said potential impressing means; and means responsive to said stopping means for actuating said moving means to move said electrodes away from each other for a predetermined time interval while said potential impressing means is still effective and thereafter interrupting the actuation of said moving means and rendering said potential impressing means ineffective.

9. Apparatus for controlling the operation of and the supply of power to a pair of bodies between which an arc is to be produced comprising electric discharge means for causing said bodies to move toward each other and away from each other; first biasing means for said discharge means having a polarity and magnitude such as to tend to cause said discharge means to effect movement of said bodies away from each other at a first rate; second biasing means for said discharge means having a polarity and magnitude such as to tend to cause said discharge means to effect movement of said bodies away from each other at a second rate higher than said first rate; start means actuable to render said first biasing means effective and said second ineffective and stop means actuable to render said second biasing means effective and said first biasing means ineffective.

10. Apparatus for controlling the operation of and the supply of power to a pair of bodies between which an arc is to be produced comprising electric discharge means for causing said bodies to move toward each other and away from each other; means for supplying an arcing potential between said bodies; first biasing means for said discharge means having a polarity and magnitude such as to tend to cause said discharge means to effect movement of said bodies away from each other at a first rate; second biasing means for said discharge means having a polarity and magnitude such as to tend to cause said discharge means to effect movement of said bodies away from each other at a second rate higher than said first rate; start means actuable to render said potential supplying means and said first biasing means effective and said second ineffective and stop means actuable to render said second biasing means effective and said first biasing means ineffective, while said potential supplying means remains effective, for a predetermined time interval and thereafter rendering said second biasing means and said potential supplying means ineffective.

11. Apparatus for controlling the operation of and the supply of power to a pair of bodies between which an arc is to be produced comprising electric discharge means for causing said bodies to move toward each other and away from each other; means for supplying an arcing potential between said bodies; means for supplying power to said discharge means; first biasing means for said discharge means having a polarity and magnitude such as to tend to cause said discharge means to effect movement of said bodies away from each other at a first rate; second biasing means for said discharge means having a polarity and magnitude such as to tend to cause said discharge means to effect movement of said bodies away from each other at a second rate higher than said first rate; start means actuable to render said potential supplying means, said power supplying means and said first biasing means effective and said second ineffective and stop means actuable to render said second biasing means effective and said first biasing means ineffective, while said potential supplying means and said power supplying means remains effective, for a predetermined time interval and thereafter rendering said second biasing means, said power supplying means and said potential supplying means ineffective.

12. In combination an electric discharge device having a control electrode and principal electrodes; first biasing means for said control electrode having a predetermined polarity and a predetermined first magnitude; second biasing means for said control electrode having said polarity and a second magnitude greater than said first magnitude; means for supplying potential to said principal electrodes; start means for rendering effective said first biasing means and said potential supplying means and stop means for rendering effective said second biasing means while said potential supplying means remains effective for a predetermined time interval and thereafter rendering said second biasing means and said potential supplying means ineffective.

13. An automatic arc welder for welding work with a consumable rod comprising means for impressing potential between said rod and said work; means for moving said rod towards and away from said work; start means for rendering effective said potential impressing means and said moving means to operate to produce welds and stop means for rendering effective said moving means to move said rod away from said work only, while said potential impressing means remains effective, for a predetermined interval of time and thereafter to render said moving means and said potential impressing means ineffective.

14. An automatic arc welder for welding work with a consumable rod comprising; a motor for moving said rod; a first electric discharge device having principal electrodes and a control electrode; means so connecting said principal electrodes to said motor that when said device is in a predetermined conductive state said motor moves said rod towards said work; a second electric discharge device having principal electrodes and a control electrode; means so connecting the principal electrodes of said second device to said motor that when said second device is in a predetermined conductive state said rod moves away from said work; means for impressing potentials on the control electrodes of said first and second devices selectively to maintain one of them in its said predetermined conductive state and the other in a conductive state other than its said predetermined conductive state and means responsive to one of said devices only when it is put into its said predetermined conductive state to vary the said impressed potential on its control electrode in one sense only.

15. An automatic arc welder for welding work with a consumable rod comprising; a motor for moving said rod; a first electric discharge device having principal electrodes and a control electrode; means so connecting said principal electrodes to said motor that when said device is conductive said motor moves said rod towards said work; a second electric discharge device having principal electrodes and a control electrode; means so connecting the principal electrodes of said second device to said motor that when said second device is conductive said rod moves away from said work; means for impressing potentials on the control electrodes of said first and second devices selectively to maintain one of them conductive and the other non-conductive and means responsive to one of said devices only when it is rendered conductive to vary the said impressed potential on its control electrode in one sense only.

16. An automatic arc welder for welding work with a consumable rod comprising; a motor for moving said rod; a first electric discharge device having principal electrodes and a control electrode; means so connecting said principal electrodes to said motor that when said device is conductive said motor moves said rod towards said work; a second electric discharge device having principal electrodes and a control electrode; means so connecting the principal electrodes of said second device to said motor that when said second device is conductive said rod moves away from said work; means for impressing potentials on the control electrodes of said first and second devices selectively to maintain one of them conductive and the other non-conductive and means responsive to said first device only when it is rendered conductive to further increase the conductivity of said first device.

17. In combination in effect a pair of electric discharge paths each defined by an anode and a cathode and each having a control electrode, the cathodes of said paths being maintained at a common potential; a first impedance; a second impedance; means connecting said impedances in series between said control electrodes; means connecting said cathodes at the junction of said impedances; means for deriving a first signal potential; means for deriving a second signal potential, means for connecting said first and second signal potential deriving means, said first impedance, said second impedance in series; a first power supply terminal; a second power supply terminal; a third power supply terminal; a fourth power supply terminal; said first and second terminals and said third and fourth terminals being adapted to supply between them respectively potentials substantially displaced in phase by substantial angles; a first capacitor; a second capacitor; means for connecting said first terminal to one of said anodes; means for connecting said second terminal and said first capacitor in series with said cathodes; means for connecting said third terminal to said other anode; means for connecting said fourth terminal and said second capacitor in series with said cathodes; and means for charging said capacitors.

18. In combination in effect a pair of electric discharge paths, each defined by an anode and a cathode, and each having a control electrode, the cathodes of said paths being maintained at a common potential; a first impedance; a second impedance; means for connecting said impedances in series between said control electrodes; means for connecting said cathodes to the junction of said impedances; means for deriving a first potential signal; means for deriving a second potential signal of a polarity tending to counteract said first signal; means responsive to the conductivity of one of said pair of paths for deriving a third potential signal dependent upon said conductivity; and means for connecting in series said first, second and third potential signal deriving means, said first impedance and said second impedance.

19. In combination a circuit including a pair of terminals from which a potential is derived when said circuit is closed; an output conductor; a pair of resistors connected in series across said terminal; a first relay including a normally open contact adapted to close said circuit, a normal open contact adapted to connect the junction of said resistors to said output conductor and a normally closed contact connected to one of said terminals to said output conductor; a second relay having a normally open contact adapted to close said circuit; means for energizing said relays independently of each other and time delay means responsive to the deenergization of said first relay for deenergizing said second relay.

20. An automatic arc welding system for welding work with a welding rod comprising means for moving said rod, means for moving said work, an inch-toward switch to be actuated for energizing said rod moving means to move said rod toward said work only while said switch is actuated, an inch-away switch to be actuated for energizing said rod moving means to move said rod away from said work only while said switch is actuated and means responsive to actuation of either of said switches for actuating both said work moving means and said rod moving means and only said last-named two means in the quiescent state of said system.

21. An automatic arc welding system for welding work with a welding rod comprising means for moving said rod, means for moving said work, an inch-toward switch to be actuated for energizing said rod moving means to move said rod toward said work only while said switch is actuated, an inch-away switch to be actuated for energizing said rod moving means to move said rod away from said work only while said switch is actuated and means responsive to actuation of either of said switches for actuating said work-moving means.

22. An automatic arc welder for welding work with a welding rod comprising means for moving said rod, means for moving said work, inching means selectively operable for actuating said rod-moving means to move towards or away from said work while said inching means remains actuated and means responsive to the actuation of said inching means for actuating said work moving means.

23. In combination, a first electric discharge device having an anode, a cathode and a control electrode, said first device being of the discontinuous control type, a capacitor; a first power supply terminal; a second power supply terminal; a third power supply terminal; said second terminal being adapted to be at a potential intermediate said first and third terminals; means for connecting said capacitor in a network including said first and second power supply terminals, said control electrode and said cathode with said first terminal electrically nearest said control electrode, whereby said capacitor is adapted to be charged by current flow between said control electrode and said cathode when said first terminal is electrically positive relative to said second terminal; means for connecting said anode to said third terminal; a second electric discharge device having an anode and a cathode, means for connecting said last-named anode to said third terminal; means for connecting the cathode of said second device to said control electrode; and means for controlling the conductivity of said second device; the said combination being characterized by the fact that said second device is of the continuous control type whereby said capacitor is discharged through said anode and cathode of said second device to an extent depending on the conductivity of said second device when said third terminal is electrically positive relative to said second terminal.

24. The combination according to claim 23 characterized by the fact that the impedance of the second discharge device and the capacity of the capacitor are within a range such that the capacitor is discharged to a sufficient extent to permit said first device to conduct during the half period during which said second device conducts, the rate of discharge depending on the instantaneous impedance of said second device and determining the instant in said half period when said first device is rendered conducting.

25. Apparatus for controlling an electric discharge device having an anode, a cathode and a control electrode, which apparatus includes means for impressing a first potential between said anode and cathode, a capacitor connected between said control electrode and said cathode and means for impressing a second potential for charging said capacitor by current flow between said control electrode and cathode thus to impress a bias between said control electrode and cathode, said apparatus being characterized by a second electric discharge device, by means for connecting said second device to said capacitor to discharge said capacitor, and by means for controlling the conductivity of said second device, and further by the fact that first and second potentials are of the alternating current type and of substantially opposite phase, and the second device is effective to discharge the capacitor sufficiently to render said first device conductive during each of the half periods when the first potential maintains the anode of the first device positive relative to its cathode.

26. In combination, an electric discharge device having a pair of principal electrodes and a control electrode, the conductivity of said device being variable in dependence upon the potential impressed on said control electrode; first biasing means which when connected to said control electrode tends to maintain said device in an intermediate condition of conductivity; second biasing means which when connected to said control electrode tends to maintain said device in an extreme condition of conductivity; means to be connected to said principal electrodes for supplying potential between said principal electrodes; start means for connecting to said control electrode said first biasing and to said principal electrodes said potential supply means; and stop means for disconnecting from said control electrode said first biasing means and connecting to said control electrode said second biasing means while said potential supply means remain connected to said principal electrode for a predetermined interval of time and for thereafter disconnecting said potential supply means.

27. An automatic arc welder for welding work with a consumable welding rod comprising a D. C. motor for feeding said rod; a first electric discharge device having an anode, a cathode, and a control electrode; means for so connecting said anode and cathode to said motor that when said device is conductive said motor feeds said rod toward said work; a second discharge device having an anode, a cathode and a control electrode; means for so connecting said anode and cathode of said second device to said motor that when said device is conductive said motor feeds said rod away from said work; and means responsive to the potential between said rod and said work and connected to said control electrodes to control the conductivity of said devices, said responsive means including means for maintaining the conductivity of said first device at a low magnitude in the absence of an arc between said rod and said work when said rod is out of engagement with said work.

28. An automatic arc welder for welding work with a rod comprising a reversible motor for feeding said rod towards or away from said work; first means responsive to the potential between said rod and said work for actuating said motor to feed said rod towards said work; and second means responsive to the potential between said rod and said work for feeding said rod away from said work; said welder being characterized by means associated with said first means and responsive to the potential between said rod and said work in the absence of an arc and with said rod out of contact with said work for reducing the speed at which said motor is actuated by said first means.

29. Apparatus according to claim 17 characterized by the fact that the first and second terminals and the third and fourth terminals, respectively, are terminals of transformer secondary windings.

30. An automatic arc welding system for welding work with a welding rod comprising means for selectively moving said rod, means for selectively moving said work, an inch-toward switch to be actuated for energizing said rod moving means to move said rod toward said work only while said switch is actuated, an inch-away switch to be actuated for energizing said rod moving means to move said rod away from said work only while said switch is actuated and means responsive to actuation of either of said switches for actuating, each selectively, both said work moving means and said rod moving means and only said last-named two means in the quiescent state of said system.

References Cited in the file of this patent
UNITED STATES PATENTS

| | | |
|---|---|---|
| 1,875,066 | McFarland | Aug. 30, 1932 |
| 2,088,659 | Moseley | Aug. 3, 1937 |
| 2,280,629 | Chapman | Apr. 21, 1942 |
| 2,329,127 | Levy | Sept. 7, 1943 |
| 2,333,363 | Collom | Nov. 2, 1943 |
| 2,370,287 | Bivens | Feb. 27, 1945 |
| 2,397,182 | Jenks | Mar. 26, 1946 |
| 2,399,387 | Reilly | Apr. 30, 1946 |
| 2,399,388 | Reilly | Apr. 30, 1946 |
| 2,409,522 | Woll | Oct. 15, 1946 |
| 2,421,991 | Carriere | June 10, 1947 |
| 2,456,936 | Frostick | Dec. 21, 1948 |
| 2,460,990 | Kratz | Feb. 8, 1949 |
| 2,476,808 | Brubaker | July 19, 1949 |
| 2,482,892 | Barwick | Sept. 27, 1949 |
| 2,483,678 | Switzer | Oct. 4, 1949 |
| 2,488,987 | Schmerber | Nov. 22, 1949 |
| 2,491,413 | Lexa | Dec. 13, 1949 |
| 2,512,122 | Vassy | June 20, 1950 |
| 2,518,222 | Carpenter | Aug. 8, 1950 |
| 2,534,958 | Deming | Dec. 19, 1950 |
| 2,539,912 | Journeau | Jan. 30, 1951 |
| 2,561,319 | Runyan | July 17, 1951 |

FOREIGN PATENTS

| | | |
|---|---|---|
| 574,811 | Great Britain | Jan. 22, 1946 |